(12) United States Patent
Dash et al.

(10) Patent No.: US 8,930,762 B1
(45) Date of Patent: Jan. 6, 2015

(54) OPTIMAL TRACKING OF CLUSTER-WIDE SHARED STORAGE CONNECTIVITY FOR GRACEFUL ERROR HANDLING

(71) Applicant: Symantec Corporation, Mountain View, CA (US)

(72) Inventors: Prasanta Dash, San Jose, CA (US); Chaitanya Yalamanchili, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 224 days.

(21) Appl. No.: 13/718,734

(22) Filed: Dec. 18, 2012

(51) Int. Cl.
*G06F 11/00* (2006.01)

(52) U.S. Cl.
CPC .................................. *G06F 11/006* (2013.01)
USPC .................... 714/37; 714/4.1; 714/48; 714/56

(58) Field of Classification Search
CPC ..... G06F 11/00; G06F 11/0709; G06F 11/18; G06F 11/30; G06F 11/3006; G06F 11/301; G06F 11/3034; G06F 11/3041; G06F 11/3051; G06F 11/3055; G06F 11/3072; G06F 11/3075; G06F 11/34; G06F 11/3419; G06F 11/3485
USPC ............. 714/37, 4.1, 18, 20, 25, 42, 43, 47.1, 714/47.3, 48, 56
See application file for complete search history.

(56) References Cited

U.S. PATENT DOCUMENTS

| 7,673,183 | B2* | 3/2010 | Bower et al. ..................... 714/39 |
| 7,702,971 | B2* | 4/2010 | Nguyen et al. ................ 714/704 |
| 8,266,474 | B2* | 9/2012 | Goel ............................... 714/4.2 |
| 8,533,539 | B2* | 9/2013 | Marathe et al. ................. 714/48 |
| 8,615,578 | B2* | 12/2013 | Hu et al. ........................ 709/224 |
| 2008/0313228 | A1* | 12/2008 | Clark et al. ............... 707/104.1 |

* cited by examiner

Primary Examiner — Joseph D Manoskey
(74) *Attorney, Agent, or Firm* — Brill Law Office; Jeffrey Brill

(57) ABSTRACT

The tracking of cluster-wide connectivity information is optimized. I/O errors that result from failed operations in which specific nodes attempt to access shared storage are detected. The start-times of failed operations are tracked. The tracked start-times are compared to the time at which the cluster-wide connectivity information was last updated. Responsive to the results of the comparing, the cluster-wide connectivity information is updated in response only to a single I/O error that results from a single failed operation that was initiated after the update time, wherein additional errors resulting from failed operations with start-times after the update time are also detected, thereby preventing redundant updates of the cluster-wide connectivity information. The update time is set to the time at which the cluster-wide connectivity information is updated.

20 Claims, 6 Drawing Sheets

OPTIMAL TRACKING OF CLUSTER-WIDE SHARED STORAGE CONNECTIVITY FOR GRACEFUL ERROR HANDLING

TECHNICAL FIELD

This disclosure pertains generally to clustering and storage management, and more specifically to optimally tracking cluster-wide shared storage connectivity.

BACKGROUND

Clusters are groups of computers that use groups of redundant computing resources in order to provide continued service when individual system components fail. More specifically, clusters eliminate single points of failure by providing multiple servers, multiple network connections, redundant data storage, etc. Clustering systems are often combined with storage management products that provide additional useful features, such as journaling file systems, logical volume management, multi-path input/output (I/O) functionality, etc.

Where a cluster is implemented in conjunction with a storage management environment, the computer systems (nodes) of the cluster can access shared storage. The shared storage is typically implemented with multiple underlying physical storage devices, which are managed by the clustering and storage system so as to appear as a single storage device to computer systems accessing the shared storage. This management of underlying physical storage devices can comprise one or more logical units as created on a SAN. In this case, multiple physical storage media are grouped into a single logical unit by, e.g., an intelligent storage array. Such a logical unit is referred to as a LUN (for "logical unit number"), and appears as a single storage device to an accessing node. The management of underlying physical storage devices can also involve software level logical volume management, in which multiple physical storage devices are made to appear to accessing nodes as one or more logical volumes. A logical volume can be constructed from multiple physical storage devices directly, or on top of a LUN, which is in turn logically constructed from multiple physical storage devices. Multiple logical volumes can be created on top of a single underlying LUN. Logical volumes and LUNs can be in the form of RAID ("Redundant Array of Independent Disks") constructs, which include striping and mirroring of stored data across multiple underlying storage devices.

In a shared storage cluster, each node of the cluster needs to have cluster-wide connectivity information for the shared storage. In other words, each node needs to track which shared storage devices are currently connected to or disconnected from which nodes within the shared storage cluster. Collecting, maintaining and exchanging this information between nodes can have high performance overhead. When an individual node encounters an I/O error accessing shared storage, it could be a result of a connectivity problem local to that node (or a local group of nodes), or it could be a result of an issue global to the cluster, such as the failure of an underlying logical or physical storage device. While it is theoretically desirable to perform a connectivity check and update connectivity information throughout the cluster whenever an I/O error occurs, this would typically have an unacceptable performance cost, both in terms of computing resources used, and delays in accessing the shared storage while I/O operations are blocked during connectivity checks.

It would be desirable to address this issue.

SUMMARY

The tracking of cluster-wide connectivity information is optimized for graceful error handling. I/O errors that result from failed operations in which specific nodes of the cluster attempt to access shared storage are detected. Detected I/O errors can result from operations that fail as a result of local node-level connectivity problems and/or as a result of the non-availability of shared storage at a cluster-wide level (for example, failure of a given LUN). The start-times of the failed operations that result in the detected I/O errors are tracked. Start-times of failed operations on specific nodes can be tracked by, for example, using the number of clock ticks since the operating system on the node was booted.

The tracked start-times of the failed operations that result in I/O errors are compared to the time at which the cluster-wide connectivity information was last updated. To facilitate these time comparisons, the start-times of I/O operations and the times at which cluster-wide connectivity information is updated are represented using compatible units of measurement and degrees of precision. In one embodiment, a single global update time is maintained for the cluster, whereas in other embodiments multiple update times are maintained, such as a global update time, a local update time, a partial update time and/or a per node update time. In one embodiment a global update time for the cluster is maintained, but specific nodes are tracked whose connectivity status changes between updates of the cluster-wide connectivity information.

Responsive to the results of comparing start-times to the update time, the cluster-wide connectivity information is updated in response only to a single I/O error that results from a single failed operation that was initiated after the update time, thereby preventing redundant updates of the cluster-wide connectivity information. In some instances, LUN level sequence numbers are used in determining a relative order of failed operations, when node level times stamps are not sufficient for this purpose. The updating of the cluster-wide connectivity information can be performed in response only to a single I/O error that results from a failed operation with a start-time after the update time, wherein other I/O errors resulting from failed operations with start-times after the update time are also detected. The updating can also be done in response only to a single detected I/O error resulting from a failed operation resulting from a single LUN level connectivity event, where additional I/O errors resulting from the same single LUN level connectivity event are also detected. This can be the case where the failed operations are on a single logical volume or multiple logical volumes based on the same LUN. In one embodiment performing a connectivity check can be deferred (or performed in asynchronously) to the extent desired, as long as the I/O can be serviced though an alternate mechanism (e.g., a different path or node).

The update time for a LUN or a logical device is set to the time at which the cluster-wide connectivity information for the LUN is updated. In one embodiment this further comprises setting the update time to a value that is higher than any current value used to measure start-times or sequences of I/O operations on any participating node or LUN of the cluster, thereby ensuring that I/O operations that began prior to the most recent update do not trigger updating the cluster-wide connectivity information for the LUN/device.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
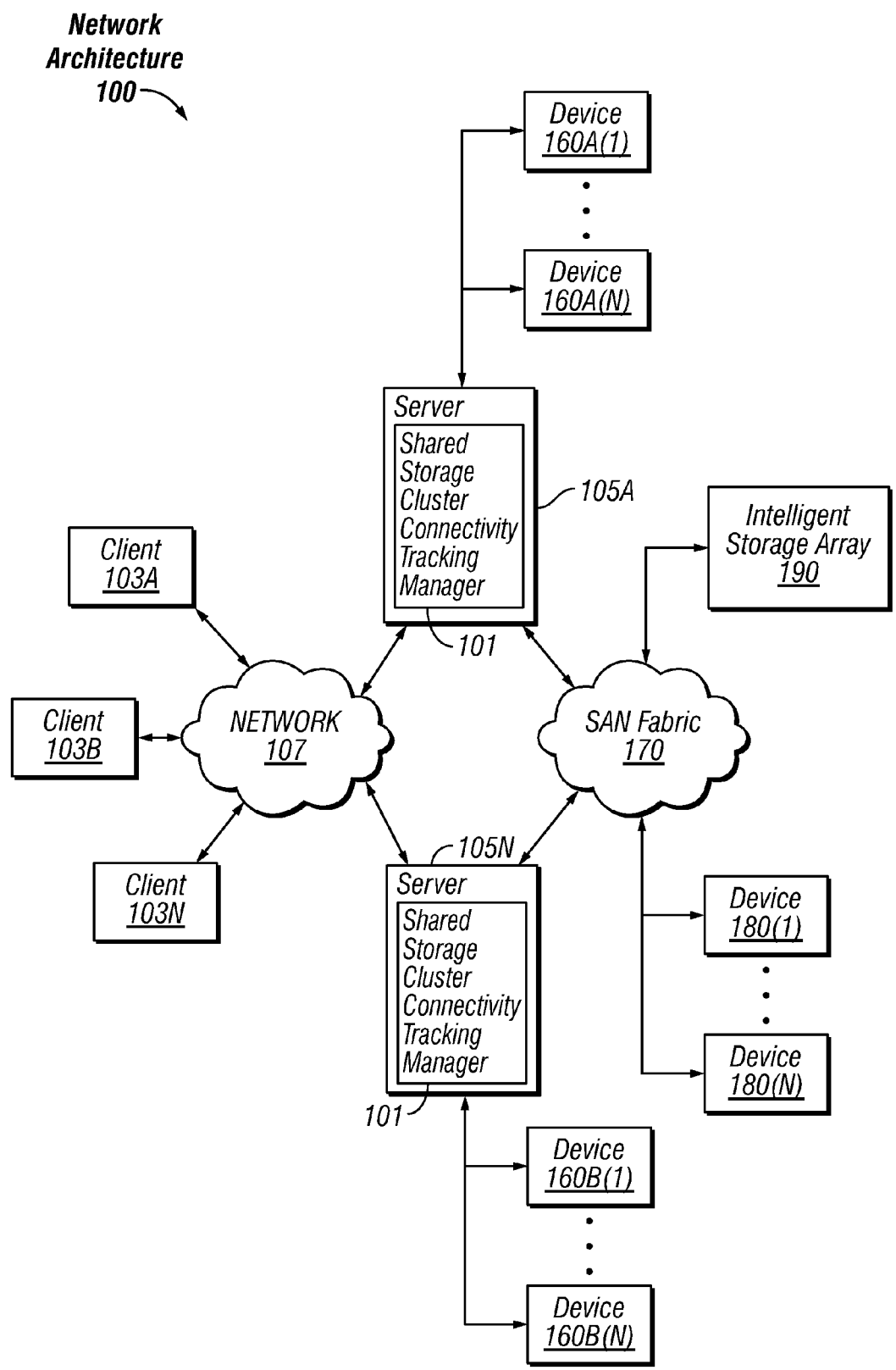
FIG. 1 is a block diagram of an exemplary network architecture in which a shared storage cluster connectivity tracking manager can be implemented, according to some embodiments.

FIG. 1 is a block diagram illustrating an exemplary network architecture 100 in which a shared storage cluster connectivity tracking manager 101 can be implemented. In the illustrated network architecture 100, client systems 103A, 103B and 103N, as well as servers 105A and 105N, are communicatively coupled to a network 107. A shared storage cluster connectivity tracking manager 101 is illustrated as residing on servers 105A and 105N, but in other embodiments the shared storage cluster connectivity tracking manager 101 can reside on more, fewer or different computers 210 as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190.

Although FIG. 1 illustrates three clients 103A-N and two servers 105A-N as an example, in practice many more (or fewer) computers can be deployed. In one embodiment, the network 107 is in the form of the Internet. Other networks 107 or network-based environments can be used in other embodiments.

Figure 2:
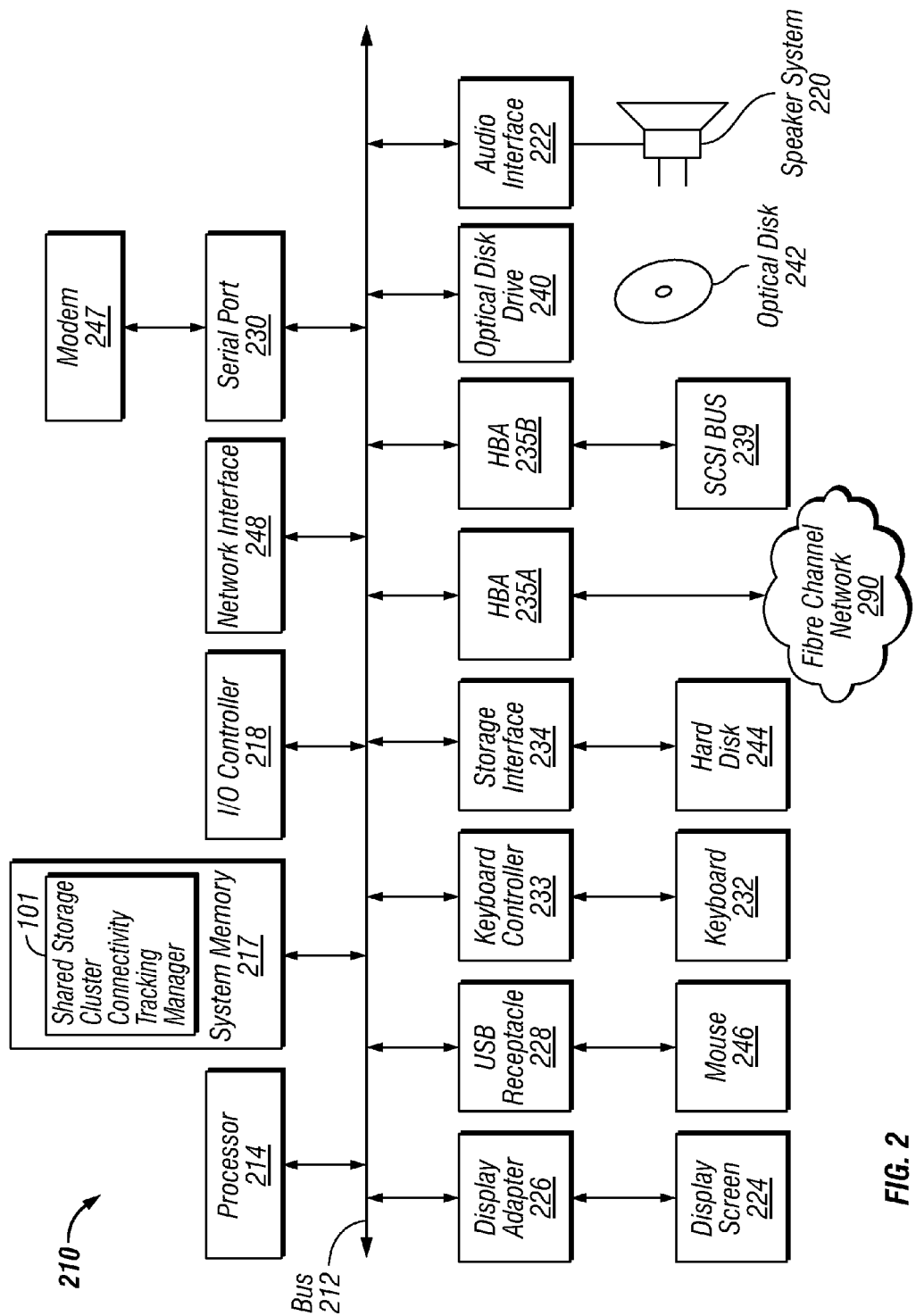
FIG. 2 is a block diagram of a computer system suitable for implementing a shared storage cluster connectivity tracking manager, according to some embodiments.

FIG. 2 is a block diagram of a computer system 210 suitable for implementing a shared storage cluster connectivity tracking manager 101. The clients 103 and servers 105 illustrated in FIG. 1 can be in the form of computers 210 such as the one illustrated in FIG. 2. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the shared storage cluster connectivity tracking manager 101 is illustrated as residing in system memory 217. The workings of the shared storage cluster connectivity tracking manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
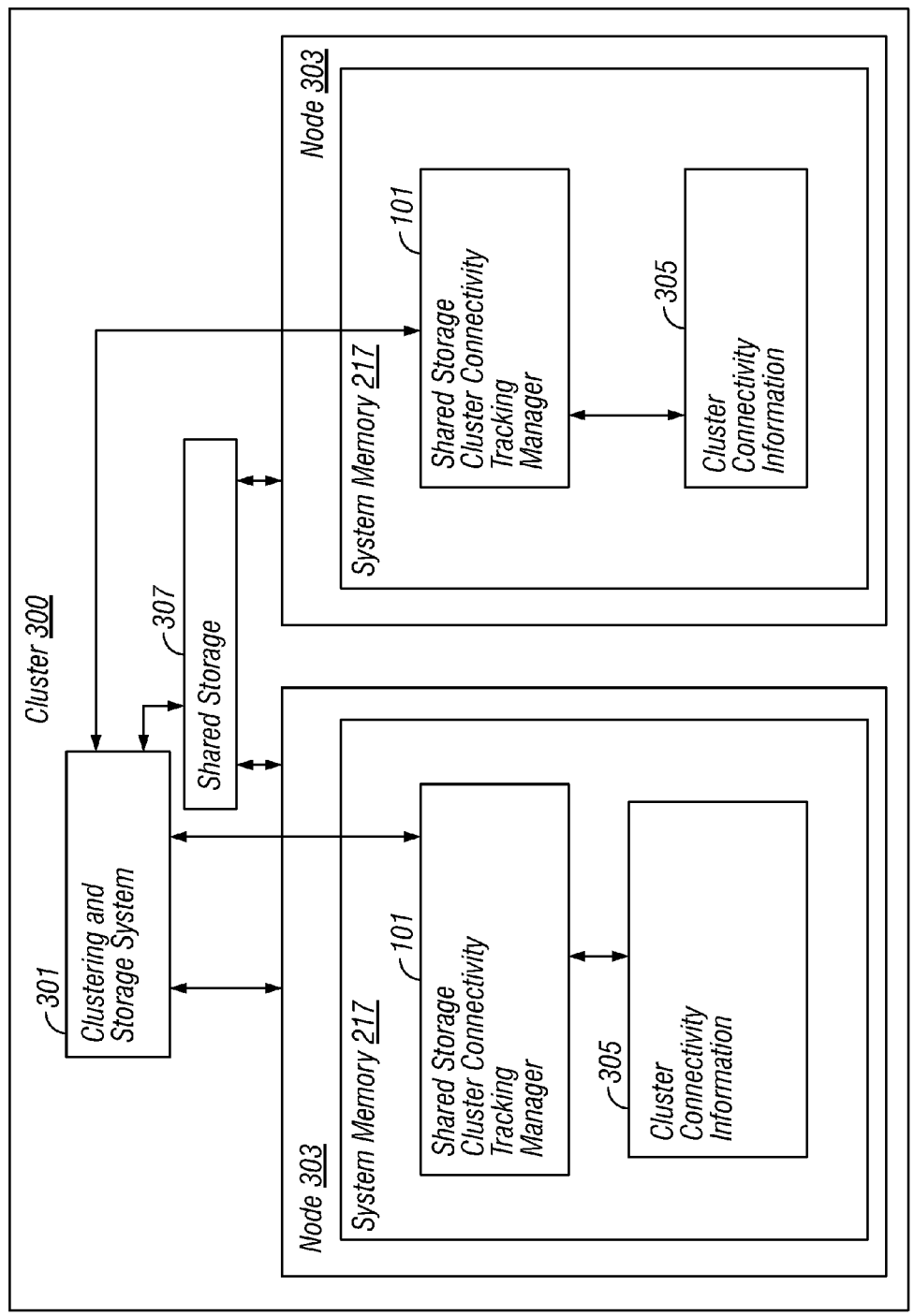
FIG. 3 is a block diagram of the operation of a shared storage cluster connectivity tracking manager, according to some embodiments.

FIG. 3 illustrates the operation of a shared storage cluster connectivity tracking manager 101, according to some embodiments. FIG. 3 illustrates an instance of a shared storage cluster connectivity tracking manager 101 running on each one of multiple nodes 303 (computer systems) of a cluster 300, wherein each node is in the form of a physical computer system 210. It is to be understood that the functionalities of the shared storage cluster connectivity tracking manager 101 can reside on a server 105, client 103, or be distributed between multiple computer systems 210, including within a fabric/cloud-based computing environment in which the functionality of the shared storage cluster connectivity tracking manager 101 is provided as a service over a network 107. It is to be understood that although a shared storage cluster connectivity tracking manager 101 is illustrated in FIG. 3 as a single entity, the illustrated shared storage cluster connectivity tracking manager 101 represents a collection of functionalities, which can be instantiated as a single or multiple modules as desired. It is to be understood that the modules of the shared storage cluster connectivity tracking manager 101 can be instantiated (for example as object code or executable images) within the system memory 217 (e.g., RAM, ROM, flash memory) of any computer system 210, such that when at least one processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the shared storage cluster connectivity tracking manager 101 can be stored on computer-readable storage media, such that when the program code is loaded into computer memory 217 and executed by at least one processor 214 of the computer system 210, the computer system 210 executes the associated functionality. Any form of non-transitory computer readable medium can be used in this context, such as magnetic or optical storage media. As used herein, the term "computer readable medium" does not mean an electrical signal separate from an underlying physical medium.

Figure 4:
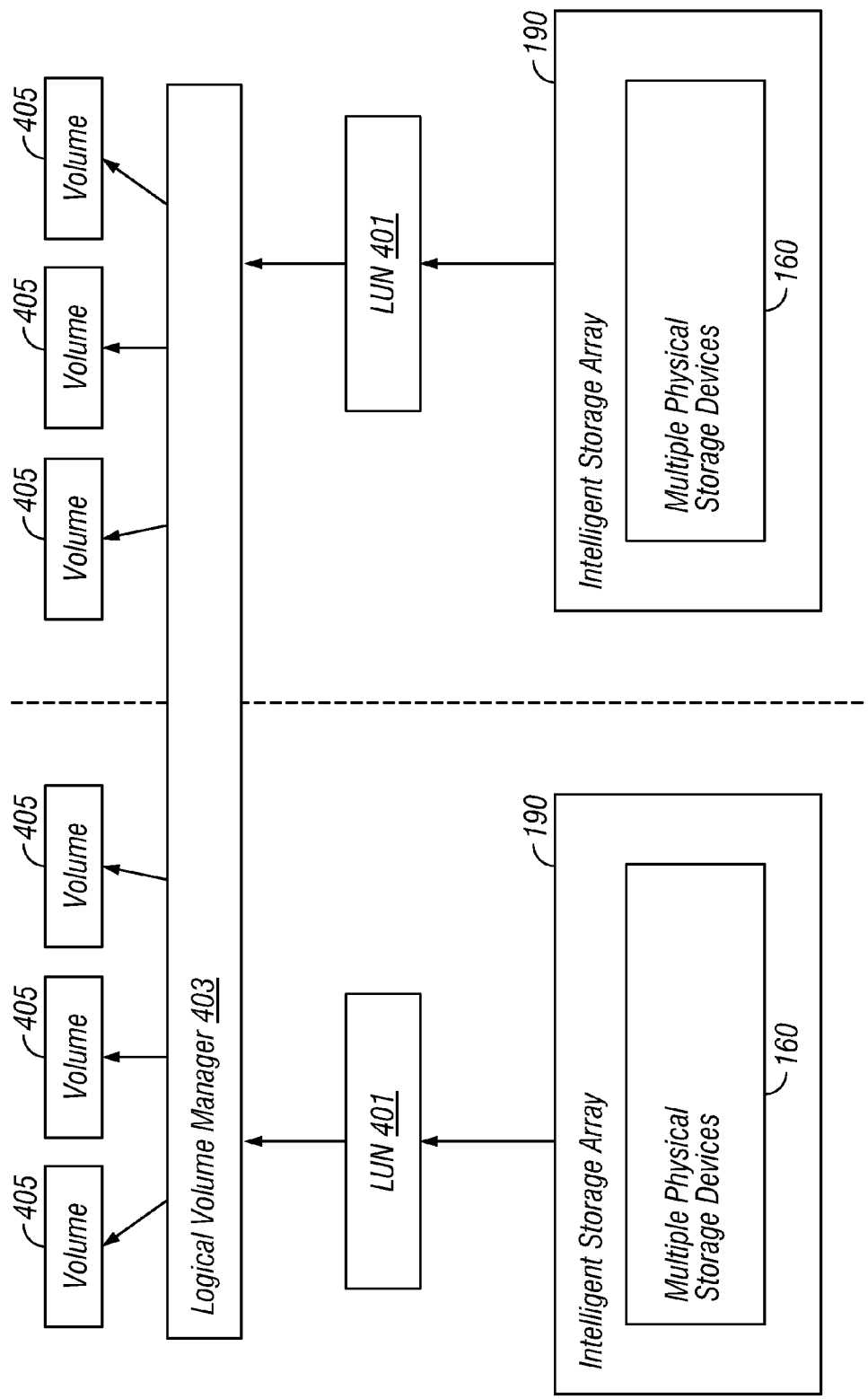
FIG. 4 is a block diagram of a shared storage architecture utilized by a shared storage cluster connectivity tracking manager, according to some embodiments.

FIG. 3 illustrates a cluster 300 instantiated in the context of a clustering and storage system 301 utilizing shared storage 307. For efficiency of illustration and explanation, the clustering and storage system 301 is illustrated as a centralized component residing outside of any node 303. It is to be understood that the clustering and storage system 301 represents a collection of functionalities, which in practice are typically instantiated as a plurality of components that are distributed throughout the cluster 300. Note also that although the shared storage 307 is illustrated and described in conjunction with FIG. 3 as if it were a single storage device 160, in practice it is typically implemented with multiple underlying physical storage devices 160, which are managed by the clustering and storage system 301 so as to appear as a single storage device 160 to computer systems 210 accessing the shared storage 307. An example of the architecture of one such scenario according to one embodiment is illustrated in FIG. 4, which is discussed in more detail below. Although FIG. 3 illustrates a cluster 300 of only two nodes 303, it is to be understood that a cluster 300 can contain more (and in some embodiments many more) than three nodes 303. Each node 303 can be instantiated as a physical/virtual host computer 210, for example of the type illustrated in FIG. 2. In some embodiments, the cluster 300 is implemented using Veritas Storage Foundation High Availability (SFHA) or Veritas Storage Foundation Cluster File System High Availability (SFCFSHA), although other embodiments can be implemented in the context of other clustering and storage management environments.

As illustrated, a shared storage cluster connectivity tracking manager 101 runs in the system memory 217 on each node 303, and implements various functionalities to optimize the tracking of cluster-wide connectivity, as described in detail below. For example, the shared storage cluster connectivity tracking manager 101 maintains a desired, scenario-specific balance between the computational resources overhead used for tracking connectivity, and the level of timeliness and precision of the tracked connectivity information 305, as appropriate for the specific circumstances. Under some circumstances or in response to specific events, given nodes 303 need absolutely current connectivity information 305 in order to operate. Under other circumstances, older, cached connectivity information 305 that does not reflect the very latest connectivity events can be sufficient. By managing the tracking of the connectivity information 305 to achieve appropriate scenario-specific tradeoffs between precision and resource usage, the shared storage cluster connectivity tracking manager 101 ensures that cluster-wide connectivity information 305 of an appropriate level of precision is available as needed, without overburdening the hardware and software resources of the cluster 300 with inefficient, computationally expensive over-tracking. Additionally, as described in detail below, some events affecting connectivity are cumulative, and it is an inefficient use of cluster resources to perform separate global cluster-wide connectivity updates in response to each of these multiple events. As detailed below, the shared storage cluster connectivity tracking manager 101 addresses this scenario by carefully tracking the sequence, destination and source of failed I/O operations and processing them in batch, thereby avoiding undesirable redundant update operations.

FIG. 4 illustrates an example of a shared storage 307 architecture, according to some embodiments. Intelligent storage arrays 190 group multiple physical storage devices 160 into single logical units (LUNs) 401. Each LUN 401 appears as a single storage device 160 to an accessing node 303. The logical volume manager 403 of the clustering and storage system 301 can in turn provide software level logical volume management to create multiple logical volumes 405 on top of each LUN 401. Although FIG. 4 illustrates two LUNs 401 each of which is logically treated as three volumes 405, it is to be understood that clusters 300 can contain more or fewer LUNs 401, and that more or fewer logical volumes 405 can be built on top of a given LUN 401. It is also possible to create a single logical volume 405 from multiple LUNs 401 (not illustrated).

Figure 5:
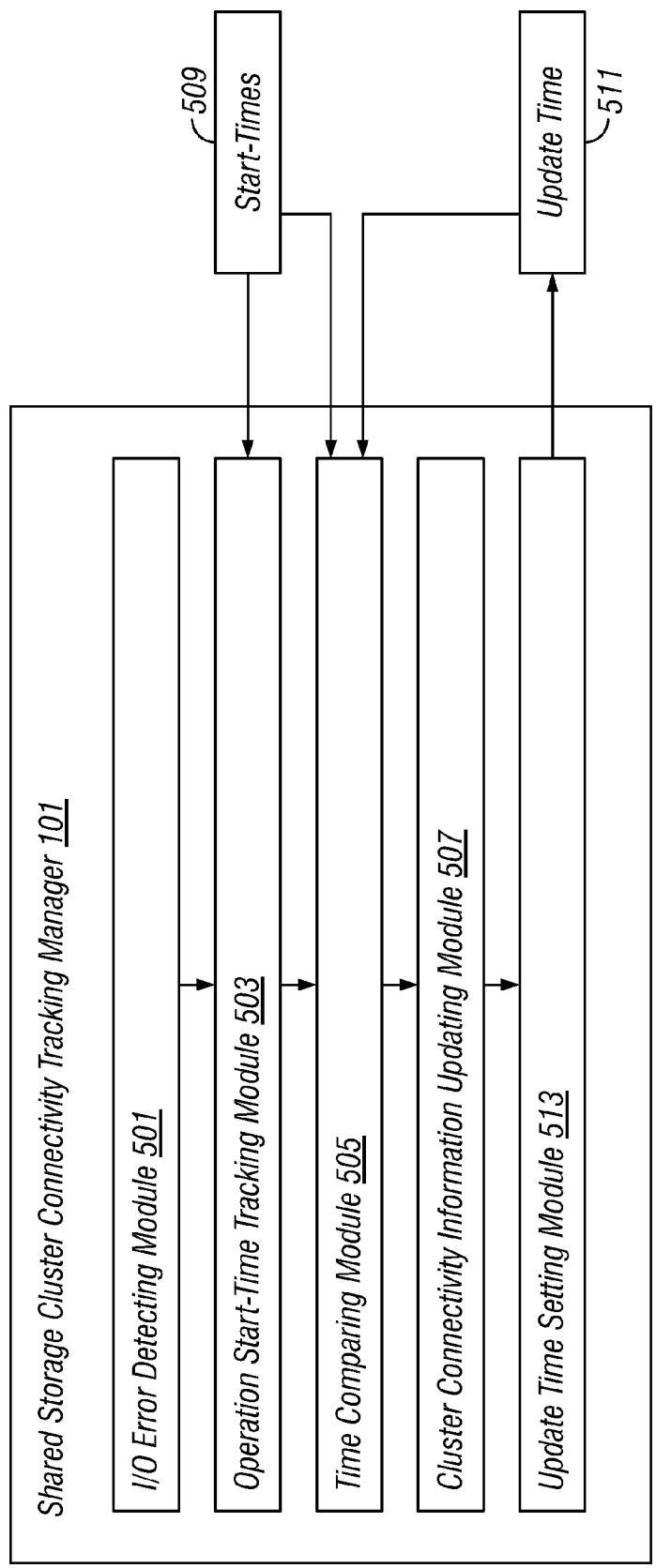
FIG. 5 is a block diagram of the modules of a shared storage cluster connectivity tracking manager, according to some embodiments.

Turning to FIG. 5, the modules of the shared storage cluster connectivity tracking manager 101 are illustrated in more detail according to one embodiment. An I/O error detecting module 501 of the shared storage cluster connectivity tracking manager 101 detects the occurrence of any I/O errors that occur during attempts to access shared storage 307 from the node 303 on which the instance of the shared storage cluster connectivity tracking manager 101 resides. Because an instance of the shared storage cluster connectivity tracking manager 101 resides on each participating node 303, all failed I/O operations that occur during attempts to access shared storage 307 by any participating node 303 are detected. This is significant, because an error that occurs during an attempt to access shared storage 307 is indicative of a connectivity status. As noted above, the I/O error could be the result of a connectivity problem local to the specific node 303 (e.g., the node 303 is fenced off from the shared storage 303), or it could an indication of the non-availability of the shared storage 307 (or an underlying storage device 160) at a cluster-wide level (e.g., the target LUN 401 is down).

An operation start-time tracking module 503 of the shared storage cluster connectivity tracking manager 101 tracks the start-times 509 of detected failed I/O operations. Note that the start-time 509 of a failed I/O operation is the time the operation was initiated, as opposed to the time that the operation terminated. Because many I/O operations can be initiated within a very brief period of time, the start-times 509 of I/O operations are tracked using a mechanism that can measure very small differences between start-times 509. In one embodiment, a system resource such as "lbolt" or "jiffy" is used to obtain the start-time 509 of I/O operations. Lbolt is a low resolution timer that is tied to the system timer interrupt, available in Linux, Solaris, AIX and other operating systems. It returns the number of clock ticks since the system was booted, and can be used by kernel or user level components to keep track of short delays or timeouts. Lbolt is an example of an implementation level mechanism that can be used to obtain I/O operation starts times, but it is to be understood that other mechanisms such as a high resolution timer or a monotonically increasing sequence number can be used for this purpose in other embodiments. Clock ticks can also be measured in other ways, such through other software interfaces, or by directing interfacing with timing hardware.

By detecting I/O errors resulting from attempts to access the shared storage 307 and tracking the start-times 509 of the failed operations, the shared storage cluster connectivity tracking manager 101 is able to batch the processing of detected I/O errors, and thereby avoid redundantly updating the cluster-wide connectivity information 305. More specifically, a time comparing module 505 of the shared storage cluster connectivity tracking manager 101 compares the start-times 509 of the detected I/O failures to the time at which the connectivity information 305 for the cluster 300 was last updated (the update time 511), in order to avoid unnecessarily updating connectivity information 305 for the cluster 300 based on failed I/O operations that started before the most recent update.

Responsive to the results of the time comparison, a cluster connectivity information updating module 507 of the shared storage cluster connectivity tracking manager 101 updates the cluster-wide connectivity information 305 only in response to a single failed operation that began after the last update. This prevents multiple updates of the connectivity information 305 in response to multiple failed operations resulting from the same event. For example, if five failures occur because of one connectivity event, the connectivity information 305 is only updated once, not five times. Additionally, this functionality can prevent redundant updates resulting from separate events. For example, if a first set of failures occurs because of a first event and a second set of failures occurs because of a second event where the two events occur in close temporal proximity, a single update of the cluster connectivity information 305 could account for all of the failures resulting from both events.

As noted above (and illustrated by FIG. 4), multiple logical volumes 403 can built on top of a single LUN 401. Where this is the case, failures of I/O operations across multiple ones of these logical volumes 403 are actually failures on a single, shared LUN 401. By batching the processing of failed I/O operations as described above, redundant updates of connectivity information 305 are not requested for multiple I/O failures resulting from a single LUN 401 level event. Once a connectivity information 305 update has occurred, additional updates are not requested for other I/O errors on the same LUN 401 with corresponding start-times 509 before the update, even if the I/O errors are not reported until after the update time 511. LUNs 401 track the sequence of their I/O operations, so where an order of events cannot be determined from tracked start-times 509 of I/O operations, the LUN 401 level sequence numbers can be used, or a combination of sequence numbers and start-times 509. Examples of instances in which start-times 509 are insufficient to determine a relative order of actions are where because multiple start-times 509 are identical, or within a margin of error based on possible variations in node clock synchronization relative to each other or to the update time 511. However, gleaning sequence number data from a LUN 401 is more computationally expensive than examining operation start-times 509 at a node 303 level, so this cost is weighed in any determination as to whether to utilize LUN 401 level sequence numbers in comparisons.

It is to be understood that if the connectivity status of a LUN 401 changes (i.e., an available LUN 401 becomes unavailable or vice versa) it is desirable to update the cluster wide connectivity information 305 to reflect this, but only once. Thus when a LUN 401 is added to the cluster or otherwise brought online, the connectivity information 305 is updated accordingly, as is the case when a LUN 401 is intentionally taken down (e.g., for maintenance). When a LUN 401 fails unexpectedly, its unavailability is detected through resulting I/O errors, as described above.

It is to be understood that the cluster connectivity information updating module 507 of the shared storage cluster connectivity tracking manager 101 need not update the cluster-wide connectivity information 305 in response to every event that occurs subsequently to the most recent update time 511. For example, in some embodiments updates are only triggered in response to certain events or types of events (e.g., failures of operations due to LUN 401 level or other global issues), whereas other events or types of events (e.g., failures of operations due to issues local to a given node 303 or group) can be aggregated such that they are only reflected in the cluster-wide connectivity information 305 when it is next otherwise updated. Which specific events are aggregated into subsequent updates under which exact circumstances can vary between embodiments as desired. It is to be understood that in one embodiment performing a connectivity check can be deferred (or performed in asynchronously), as long as I/O operations can be serviced though an alternate mechanism (e.g., a different path or node 303).

Note that whenever the cluster connectivity information 305 is updated, an update time setting module 513 of the shared storage cluster connectivity tracking manager 101 sets the update time 511 to the time at which the update occurred. To facilitate comparison, the start-times 509 and the update time 511 are represented using compatible units of measurement and degrees of precision. The clocks on the various nodes 303 of the cluster 300 might not be in synchronization, and thus it can be non-trivial to determine whether a given operation start-time 509 occurred before or after the most recent update time 511. In one embodiment, a single node specific time is used to denote the times 511 of all updates of cluster connectivity information 305, and to the extent practicable the clocks of the nodes 303 of the cluster 300 may be synchronized thereto. In other embodiments, multiple update times 511 are tracked for different levels of granularity, for example the times of local updates, cluster-wide/global updates and partial/per-node updates. In such embodiments, the time comparing module 505 can compare particular start-times 509 to a particular update time 511 for further optimization. For example, the time comparing module 505 can compare start-times 509 of local failed I/O operations to relevant local update times $511_{local}$ pertaining to a given node 303 or group, and failures of operations on shipped I/O to the global update time $511_{global}$. In one embodiment, as opposed to maintaining multiple per-node update times 511 (times at which specific nodes 303 provided updates concerning their local connectivity status), the update time setting module 513 maintains a single update time 511 for the cluster 300 (the time at which cluster-wide connectivity information 305 was last updated), but tracks individual nodes 303 whose connectivity status has changed since the last global update. The comparing module 505 can then compare start-times 509 of local failed I/O operations on those nodes 303 using their current status.

It is possible for a connectivity information update to start and complete within a very short interval, for example less than a clock tick such that lbolt/jiffy would not have changed. This makes it non-trivial to determine whether a given I/O failed operation was initiated before or after the current update time 511 (i.e., the time of the most recent connectivity status update). In one embodiment the update time setting module 513 addresses this issue by setting the update time 511 to a value that is higher than any current value used to measure start-times 511 and/or sequences of I/O operations on any participating LUN 401 or node 303. Thus, I/O operations that began prior to the most recent update will never trigger updates because the update time 511 is necessarily greater than the start-times 511 of such operations. As time passes before the next update of connectivity status information 305, a connectivity event indicated by the failure of a subsequently started I/O operation can trigger an update, based on the comparing functionality described above.

Figure 6:
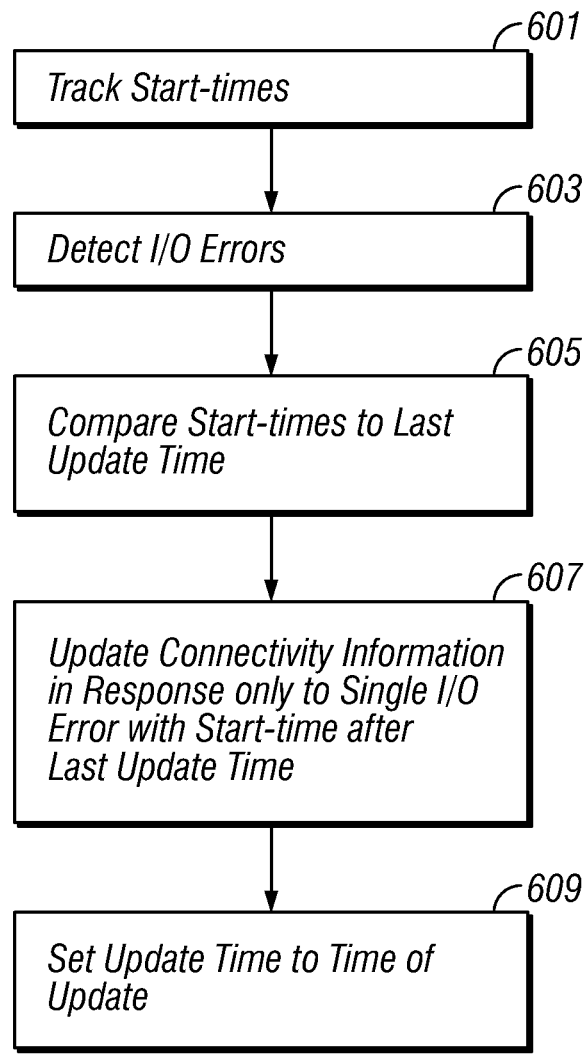
FIG. 6 is a flowchart illustrating steps of the operation of a shared storage cluster connectivity tracking manager, according to some embodiments.

FIG. 6 is a flowchart showing steps of the operation of the shared storage cluster connectivity tracking manager 101, according to some embodiments. The operation start-time tracking module 503 tracks 601 the start-times 509 of I/O operations, which results in a record of the start-times 509 of failed operations that result in I/O errors. The I/O error detecting module 501 detects 603 I/O errors that result from failed operations in which specific nodes 303 of the cluster 300 attempt to access shared storage 307. The time comparing module 505 compares 605 start-times 509 of the failed operations that result in I/O errors to the update time 511 at which cluster-wide connectivity information 305 was last updated. Responsive to results of the comparing, the cluster connectivity information updating module 507 updates 607 the cluster-wide connectivity information 305 in response only to a single I/O error that results from a single failed operation that was initiated after the update time 511, thereby preventing redundant queries/updates of the cluster-wide connectivity information 305. The update time setting module sets 609 the update time 511 to the time at which the cluster-wide connectivity information 305 was updated.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats.

The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for optimized tracking of cluster-wide connectivity information in a clustering and storage system comprising a plurality of nodes and shared storage, the method comprising the steps of:
    detecting I/O ("input/output") errors that result from failed operations in which specific nodes of the cluster attempt to access shared storage;
    tracking start-times of failed operations that result in I/O errors;
    comparing start-times of failed operations that result in I/O errors to an update time, the update time comprising a time at which cluster-wide connectivity information was last updated;
    responsive to results of the comparing, updating the cluster-wide connectivity information in response only to a single I/O error that results from a single failed operation that was initiated after the update time, thereby preventing redundant updates of the cluster-wide connectivity information; and
    setting the update time to the time at which the cluster-wide connectivity information is updated.

2. The method of claim 1 further comprising:
    detecting an I/O ("input/output") error that results from an operation that failed as a result of non-availability of shared storage at a cluster-wide level.

3. The method of claim 1 further comprising:
    detecting an I/O ("input/output") error that results from an operation that failed as a result of a connectivity problem local to a specific node of the cluster attempting to access shared storage.

4. The method of claim 1 further comprising:
    deferring performance of a connectivity check by a specific node.

5. The method of claim 1 wherein updating the cluster-wide connectivity information in response only to a single I/O error that results from a single failed operation that was initiated after the update time, thereby preventing redundant updates of the cluster-wide connectivity information, further comprises:
    updating the cluster-wide connectivity information in response only to a single I/O error that results from a failed operation with a start time after the update time, wherein additional I/O errors are detected, the additional I/O errors also resulting from failed operations having start-times after the update time.

6. The method of claim 1 wherein updating the cluster-wide connectivity information in response only to a single I/O error that results from a single failed operation that was initiated after the update time, thereby preventing redundant updates of the cluster-wide connectivity information, further comprises:
    updating the cluster-wide connectivity information in response only to an I/O error that results from a failed operation resulting from a first event, wherein at least one additional detected I/O error results from at least one additional failed operation resulting from a second event.

7. The method of claim 1 wherein updating the cluster-wide connectivity information in response only to a single I/O error that results from a single failed operation that was initiated after the update time, thereby preventing redundant updates of the cluster-wide connectivity information, further comprises:
updating the cluster-wide connectivity information in response only to a single detected I/O error resulting from a failed operation resulting from a single logical unit ("LUN") level connectivity event, wherein at least one additional detected I/O error results from at least one additional failed operation resulting from the same single LUN level connectivity event.

8. The method of claim 7 wherein updating the cluster-wide connectivity information in response only to a single detected I/O error resulting from a failed operation resulting from a single logical unit ("LUN") level connectivity event further comprises:
updating the cluster-wide connectivity information in response only to a single detected I/O error resulting from a failed operation on a first logical volume resulting from a single logical unit ("LUN") level connectivity event, wherein at least one additional detected I/O error results from at least one additional failed operation on a second logical volume resulting from the same single LUN level connectivity event.

9. The method of claim 1 wherein updating the cluster-wide connectivity information in response only to a single I/O error that results from a single failed operation that was initiated after the update time, thereby preventing redundant updates of the cluster-wide connectivity information, further comprises:
using LUN level sequence numbers in determining a relative order of failed operations.

10. The method of claim 1 wherein comparing start-times of failed operations to the update time further comprises:
representing start-times of operations and the update time using compatible units of measurement and degrees of precision.

11. The method of claim 10 further comprising:
maintaining a single global update time for the cluster.

12. The method of claim 10 further comprising:
maintaining a global update time for the cluster; and
tracking specific nodes whose connectivity status changes between updates of the cluster-wide connectivity information.

13. The method of claim 10 further comprising:
maintaining at least two update times for the cluster from a group of update times consisting of: a global update time, a local update time, a partial update time and a per node update time.

14. The method of claim 1 wherein setting the update time to the time at which the cluster-wide connectivity information is updated further comprises:
setting the update time to a value that is higher than any current value used to measure start-times or sequences of I/O operations on any participating LUN or node of the cluster, thereby ensuring that I/O operations that began prior to the most recent update do not trigger updating the cluster-wide connectivity information.

15. At least one non-transitory computer readable-storage medium for optimized tracking of cluster-wide connectivity information in a clustering and storage system comprising a plurality of nodes and shared storage, the at least one non-transitory computer readable-storage medium storing computer executable instructions that, when loaded into computer memory and executed by at least one processor of a computing device, cause the computing device to perform the following steps:
detecting I/O ("input/output") errors that result from failed operations in which specific nodes of the cluster attempt to access shared storage;
tracking start-times of failed operations that result in I/O errors;
comparing start-times of failed operations that result in I/O errors to an update time, the update time comprising a time at which cluster-wide connectivity information was last updated;
responsive to results of the comparing, updating the cluster-wide connectivity information in response only to a single I/O error that results from a single failed operation that was initiated after the update time, thereby preventing redundant updates of the cluster-wide connectivity information; and
setting the update time to the time at which the cluster-wide connectivity information is updated.

16. The at least one non-transitory computer readable-storage medium of claim 15 further storing computer executable instructions to perform the following additional step:
updating the cluster-wide connectivity information in response only to an I/O error that results from a failed operation with a start-time after the update time, wherein additional I/O errors are detected, the additional I/O errors also resulting from failed operations having start-times after the update time.

17. The at least one non-transitory computer readable-storage medium of claim 15 further storing computer executable instructions to perform the following additional step:
updating the cluster-wide connectivity information in response only to an I/O error that results from a failed operation resulting from a first event, wherein at least one additional detected I/O error results from at least one additional failed operation resulting from a second event.

18. The at least one non-transitory computer readable-storage medium of claim 15 further storing computer executable instructions to perform the following additional step:
updating the cluster-wide connectivity information in response only to a single detected I/O error resulting from a failed operation resulting from a single logical unit ("LUN") level connectivity event, wherein at least one additional detected I/O error results from at least one additional failed operation resulting from the same single LUN level connectivity event.

19. The at least one non-transitory computer readable-storage medium of claim 18 further storing computer executable instructions to perform the following additional step:
updating the cluster-wide connectivity information in response only to a single detected I/O error resulting from a failed operation on a first logical volume resulting from a single logical unit ("LUN") level connectivity event, wherein at least one additional detected I/O error results from at least one additional failed operation on a second logical volume resulting from the same single LUN level connectivity event.

20. A computer system for optimized tracking of cluster-wide connectivity information in a clustering and storage system comprising a plurality of nodes and shared storage, the computer system comprising:

system memory;

an I/O error detecting module residing in the system memory, the I/O error detecting module being programmed to detect I/O ("input/output") errors that result from failed operations in which specific nodes of the cluster attempt to access shared storage;

an operation start-time tracking module residing in the system memory, the operation start-time tracking module being programmed to track start-times of failed operations that result in I/O errors;

a time comparing module residing in the system memory, the time comparing module being programmed to compare start-times of failed operations that result in I/O errors to an update time, the update time comprising a time at which cluster-wide connectivity information was last updated;

a cluster connectivity information updating module residing in the system memory, the cluster connectivity information updating module being programmed to update the cluster-wide connectivity information in response only to a single I/O error that results from a single failed operation that was initiated after the update time, thereby preventing redundant updates of the cluster-wide connectivity information; and an update time setting module residing in the system memory, the update time setting module being programmed to set the update time to the time at which the cluster-wide connectivity information is updated.

* * * * *